US005544155A

United States Patent [19]

Lucas et al.

[11] Patent Number: 5,544,155

[45] Date of Patent: Aug. 6, 1996

[54] METHOD OF SYNCHRONIZATION FOR CODE DIVISION MULTIPLE ACCESS RADIOTELEPHONE COMMUNICATIONS

[75] Inventors: Philippe Lucas, Palaiseau; Philippe Mege, Bourg La Reine; Stéphane Pineau, Le Chesnay, all of France

[73] Assignee: Matra Communication, France

[21] Appl. No.: 260,928

[22] Filed: Jun. 15, 1994

[30] Foreign Application Priority Data

Jun. 16, 1993 [FR] France .................................. 93 07269

[51] Int. Cl.$^{6}$ ............................ H04B 1/69; H04B 7/216; H04J 13/02; H04L 27/30

[52] U.S. Cl. ............................ 370/18; 370/21; 370/107; 375/205; 375/206; 375/208; 375/267; 379/58; 455/56.1; 455/67.6

[58] Field of Search ................................ 370/13, 17, 18, 370/19, 21, 22, 23, 100.1, 107, 105.4; 375/1, 96, 106, 111, 113, 115, 116, 200, 205, 206, 208, 209, 210, 343, 354, 362, 364, 367, 368; 380/33, 34; 455/49.1, 50.1, 51.1, 53.1, 54.1, 56.1, 67.1, 67.3, 67.4, 67.6; 379/58.59

[56] References Cited

U.S. PATENT DOCUMENTS 4,475,214 10/1984 Gutleber .................................. 370/18
4,494,228 1/1985 Gutleber .................................. 370/18
4,561,089 12/1985 Rouse et al. .............................. 370/18
4,567,588 1/1986 Jerrim ..................................... 370/18
4,601,047 7/1986 Horwitz et al. ........................... 370/18
5,103,459 4/1992 Gilhousen et al. ........................ 375/1
5,111,478 5/1992 McDonald ................................. 375/1
5,309,474 5/1994 Gilhousen et al. ........................ 375/1

FOREIGN PATENT DOCUMENTS 0216974 4/1987 European Pat. Off. .
3922972 1/1990 Germany .

*Primary Examiner*—Alpus Hsu
*Attorney, Agent, or Firm*—Larson and Taylor

[57] ABSTRACT

A synchronization method includes selecting, at a mobile station, at least one periodic pseudorandom sequence (PN) which corresponds to, and is synchronized with, the reference sequence transmitted by a base station on a pilot channel, and received by the mobile station over a propagation path, this operation being carried out regardless of the frequency deviation between the transmitter and the receiver. Various possible sequences are tested by calculating the quantities $E[s(t)\cdot s^*(t-\tau)]$ and $E[s(t)\cdot s^*(t)]$, where $E[\cdot]$ designates the mean value calculated over a predetermined integration time, $\tau$ designates a predetermined delay, and $s(t)=r(t)\cdot c(t)$ designates the product of the received base band signal r(t) and the value (c(t)) of the tested sequence, and by calculating the ratio $|E[s(t)\cdot s^*(t-\tau)][|/Es(t)\cdot s^*(t)]$. The sequence under test is selected if the ratio exceeds a predetermined threshold.

13 Claims, 2 Drawing Sheets

METHOD OF SYNCHRONIZATION FOR CODE DIVISION MULTIPLE ACCESS RADIOTELEPHONE COMMUNICATIONS

BACKGROUND OF THE INVENTION

The present invention relates to code-division multiple access (CDMA) radiotelephone communications.

CDMA is a method of spread spectrum digital communication in which a plurality of transmission channels are created by using spreading sequences for each channel that modulate the information bits to be transmitted. The spreading sequences operate at a chip rate higher than the data bit rate in order to achieve spectrum spreading of the radio signal. Their self- and cross-correlation properties are adapted to enable the various channels to be multiplexed: they are generally pseudorandom sequences that are mutually orthogonal or quasi-orthogonal, taking chip values of −1 or +1.

The use of CDMA in the field of cellular radiotelephony is described in chapter I of the work "Mobile radio communications" by Raymond Steele, Pentech Press, London 1992, and also in the article "On the system design aspects of code division multiple access (CDMA) applied to digital cellular and personal communications networks" by A. Salmasi and K. S. Gilhousen, Proc. of the 41st IEEE Vehicular Technology Conference, St. Louis, Mo., 19–22 mai 1991. The multiplexed transmission channels are formed at the base station of each cell in the network. Each mobile station situated within the cell uses a special spreading sequence to recover, from the overall radio signal transmitted by the base station, the data bits that are adressed thereto.

In the system described in the above publications, the various spreading sequences are obtained from a common reference sequence having a chip rate of 1.2288 MHz, and period of 32 768 chips. Since the radio modulation is quadrature phase shift keying, the reference sequence includes an in-phase component and a quadrature component. Sixty-four transmission channels are formed in the base station by combining the reference sequence with each of the sixty-four Walsh codes of length 64. The channel defined by Walsh code $W_0$, which comprises nothing but 1, is a pilot channel over which no data bits are sent. The pilot channel does transmit the reference sequence synchronously with the set of spreading sequences. The mobile stations have a priori knowledge of the values of the reference sequence such that, on receiving the pilot channel, they can synchronize themselves with the base station to receive the data bits that are respectively addressed to each of them.

Whether or not use is made of the Walsh code technique, it is always useful to form a pilot channel enabling the mobile channels to synchronize themselves. The pilot channel carries a reference pseudo-random periodic sequence having the same chip rate as the spreading sequences and synchronized therewith.

Various methods exist for obtaining the desired synchronization, all of which make use of the advantageous self- and cross-correlation properties of pseudo-random sequences. They are based on calculating the cross-correlation between the sequence received on the pilot channel and a sequence tested by the mobile station, given that the results of such an operation will always be low except when the sequences are synchronized and identical.

A first synchronization method uses matched filters, i.e. filters whose coefficients are equal to the samples of the tested sequence. The result of such filtering is thus directly the value of the looked-for cross-correlation. Since the output rate of this filter is the same as the input rate, a correlation peak is detected when the mobile station is synchronized, and as a result the mean synchronization time is relatively short.

A second method makes use of correlators that apply the same principle. The received signal is multiplied by the tested sequence and integration over a plurality of samples makes it possible to detect a correlation peak, if any. When there is no correlation peak, then the operation is reiterated, either with the same sequence subjected to a time offset, or else with a different sequence. The mean time to obtaining synchronization is significantly longer than it is with the first method.

Both of those two methods suffer from the drawback of significantly degraded performance in the event of frequency deviation occurring in the received radio signal. Under such circumstances, it is no longer possible to associate a correlation peak with genuine synchronization. Frequency deviation may be due to the Doppler effect, to Rayleigh fading, or to differences in the characteristics of the local oscillators of the stations in communication. To cope with this problem, the correlations must be performed by making an assumption about the value of the frequency deviation to which the received signal has been subjected, and by using a battery of matched filters whose respective frequencies correspond to the various different possible values of deviation. The results of the various different filterings are compared and the largest correlation peak is used as a basis for determining which filter can be used to obtain the looked-for time and frequency synchronization. Such a solution is not optimal in terms of performance. In addition, it significantly increases the complexity of the receiver.

An object of the present invention is to remedy the above difficulties, by proposing a time synchronization method that is not very sensitive to possible frequency deviation in the radio signal.

SUMMARY OF THE INVENTION

The invention thus provides a method of synchronization, for CDMA radiotelephone communications in which a base station establishes a pilot channel in addition to a plurality of CDMA transmission channels each defined by a respective spreading sequence modulating data bits to be transmitted, a periodic pseudorandom reference sequence synchronized with the spreading sequences and having a chip rate greater than the bit rate of the data bits to be transmitted being transmitted over the pilot channel, the base band signals transmitted over said channels being combined and then modulated on a carrier frequency to form the radio signal transmitted by the base station to mobile stations. The synchronization method consists in selecting, at a mobile station, at least one periodic pseudorandom sequence which corresponds to and is synchronized with the reference sequence transmitted over the pilot channel of a base station and received by the mobile station over a propagation path. At the mobile station, various possible sequences are tested by calculating the quantities $E[s(t)\cdot s^*(t-\tau)]$ and $E[s(t)\cdot s^*(t)]$, in which $E[\cdot]$ designates the mean value calculated over a predetermined integration time (T), $\tau$ designates a predetermined delay, and $s(t)=r(t)\cdot c(t)$ designates the product of the received base band signal by the value of the sequence under test, and by calculating the ratio $|E[s(t)\cdot s^*(t-\tau)]|/E[s(t)\cdot s^*(t)]$. The sequence under test is selected if said ratio exceeds a predetermined threshold.

The robustness of this synchronization method in the presence of frequency deviation can be explained as follows: The base band complex signal received over the pilot channel is of the form $r(t)=A(t)\cdot e^{2\pi j\Delta f t}c'(t)$, where c'(t) is the reference sequence received with a time offset, A(t) represents the disturbances due to the propagation channel, and the exponential term represents frequency deviation of the signal. The following is thus obtained for a tested sequence c(t):

$$\begin{aligned} E[s(t)\cdot s^*(t-\tau)] &= E[A(t)\cdot c'(t)\cdot c(t)\cdot e^{2\pi j\Delta f t}\cdot A(t-\tau)\cdot \\ &\quad c'(t-\tau)\cdot c(t-\tau)\cdot e^{-2\pi j\Delta f(t-\tau)}] \\ &= E[A(t)\cdot c'(t)\cdot c(t)\cdot A(t-\tau)\cdot \\ &\quad c'(t-\tau)\cdot c(t-\tau)\cdot e^{2\pi j\Delta f\tau}] \end{aligned}$$

and $$\begin{aligned} E[s(t)\cdot s^*(t)] &= E[A(t)\cdot c'(t)\cdot c(t)\cdot e^{2\pi j\Delta f t}\cdot \\ &\quad A(t)\cdot c'(t)\cdot c(t)\cdot e^{-2\pi j\Delta f t}] \\ &= E[A(t)\cdot c'^2(t)\cdot c^2(t)\cdot A(t)] \\ &= E[A(t)^2] \end{aligned}$$

If the tested sequence corresponds to the reference sequence and is synchronized, then c(t)=c'(t), whence:

$$E[s(t)\cdot s^*(t-\tau)]=E[A^2(t)]\cdot e^{2\pi j\Delta f t} \quad (1)$$

Otherwise:

$$E[s(t)\cdot s^*(t-\tau)]=E[A^2(t)]\cdot E[c'(t)\cdot c(t)\cdot c'(t-\tau)\cdot c(t-\tau)]\cdot e^{2\pi j\Delta f t}$$

It can thus be seen that the modulus of the quantity $E[s(t)\cdot s^*(t-\tau)]$ and also the quantity $E[s(t)\cdot s^*(t)]$, are independent of the frequency deviation in the received radio signal. The ratio of these two quantities is close to unity when synchronization is achieved, and otherwise it is significantly smaller since the correlation properties of the sequences then imply that $E[c'(t)\cdot c(t)\cdot c'(t-\tau)\cdot c(t-\tau)]<<1$. By comparing the ratio with a threshold, it is possible to determine whether the tested sequence is properly synchronized, even in the presence of frequency deviation.

Another important advantage of the method is that when time synchronization is performed, it is possible to discover the value of frequency deviation to which the radio signal has been subjected from the argument of the complex quantity $E[s(t)\cdot s^*(t-\tau)]$, and therefore a priori, to correct the frequency of the local oscillator, so as to make the signal understandable by the receiver.

In a particular embodiment of the invention, the mean values are calculated not on the above-defined quantities s(t) but on a signal s'(t) obtained by integrating the quantity s(t) over a shorter duration. This implementation is particularly suitable when in the presence of a relatively low signal to noise ratio.

DESCRIPTION OF PREFERRED EMBODIMENTS

In a cellular radiotelephone system, base stations are distributed over the territory that is to be covered. In the zone or "cell" covered by a given base station, a plurality of mobile stations may communicate simultaneously with the base station. The method of the invention is applicable to downlinks, i.e. to the transmission of signals from a base station to mobile stations, for which code division multiple access (CDMA) is used.

Figure 1:
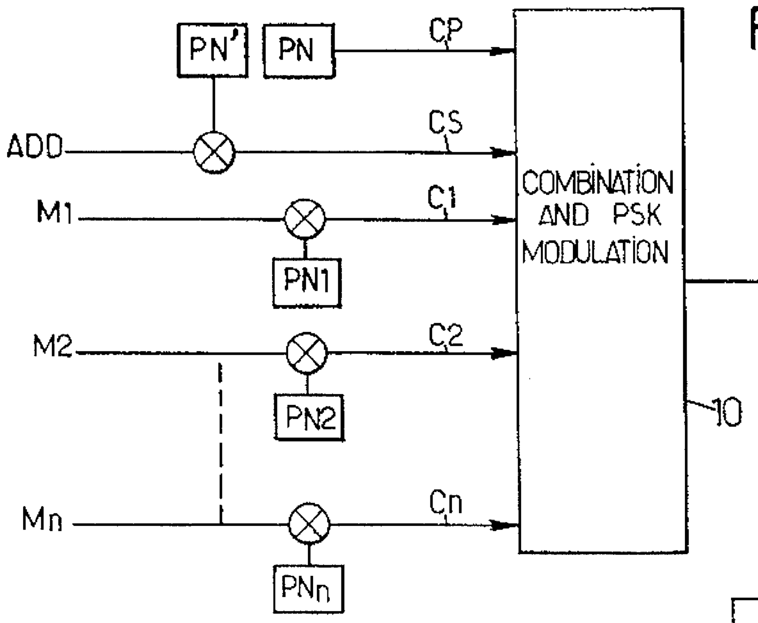
FIG. 1 is a block diagram of the transmitter portion of a base station in a radiotelephone system operating in CDMA mode.

Each base station, such as the station shown in FIG. 1, sets up CDMA transmission channels C1, C2, . . . Cn each defined by a respective spreading sequence. The spreading sequences which take the values +1 or −1 are periodic, pseudorandom, and substantially decorrelated. They are at a chip rate that is higher than the bit rate of the data bits to be transmitted, for example they are at a rate of 1 MHz. In the example described, the spreading sequences are very long (period $2^{41}-1$). All of them correspond to the same base sequence of period $2^{41}-1$, and they are obtained by applying respective time offsets to said base sequence, each offset being characteristic of the user (mobile station) with which a call is established over the corresponding channel. The instantaneous position in the base sequence is indicated by an address ADD. In each CDMA channel, the data bits to be transmitted M1, M2, . . . Mn, that represent voice or data signals previously encoded by conventional techniques, are multiplied by the spreading sequence produced by a suitable generator which may be conventionally constituted by a cascade of 41 bistables.

The base station also forms a pilot channel CP and a synchronization channel CS. A reference sequence PN is transmitted over the pilot channel CP without being modulated by data bits. The sequence PN which takes the values +1 or −1 is periodic and pseudorandom. Its chip rate is the same as that of the spreading sequences with which it is synchronized. The synchronization channel CS serves to transmit the address ADD which is updated in each period of the reference sequence PN. The address bits ADD are modulated by a sequence PN' associated with the reference sequence PN. The sequence PN' has the same chip rate and the same period as the sequence PN, and it is synchronized therewith.

By way of example, the reference sequence PN and its associated sequence PN' are Gold sequences of period 1023 (see "optimum binary sequences for spread spectrum multiplexing" by R. Gold, IEEE Trans. Inform. Theory, IT-13, pages 619–621, October 1967). 512 Gold sequences of period 1023 are used, forming 256 pairs. A pair of Gold sequences is allocated to each base station, one for the sequence PN and the other for the sequence PN'. Different pairs of sequences are allocated to the base stations in adjacent cells in order to prevent interference between base stations in boundary regions.

The base band signals formed in the tranmission channels C1, C2 . . . , Cn, the pilot channel CP, and the synchronization channel CS are combined and then modulated on a carrier frequency (block 10 in FIG. 1). Combination is performed by summing the base band signals, optionally using weights. By way of example, the carrier frequency may be 2.4 GHz. The modulation may consist of binary phase shift keying when the base band signals are real.

However, the base band signals are usually complex, in which case quadrature phase shift keying should be used. Under such circumstances, each of the pseudorandom sequences PN1, PN2 . . . , PNn, PN, PN' includes two independent components used respectively for the I phase and the Q phase of the corresponding channel.

The radio signal obtained after modulation is transmitted via the antenna 12 towards the mobile stations in the cell.

In a mobile station (FIG. 2), the radio signal received by the antenna 14 is demodulated into base band by the radio stage 16 by means of a carrier FP obtained from a local oscillator 18. The digitalized base band signal r(t) can then be processed by conventional CDMA circuits 20. As represented symbolically in FIG. 2, the circuits 20 typically correlate the received base band signal r(t) with the spreading sequence PNi allocated to the mobile station to extract, where appropriate, the data bits Mi addressed to the mobile station, with the other CDMA components of the signal r(t) being eliminated because of the orthogonal properties of the spreading sequences.

This processing requires the spreading sequence PNI to be synchronized relative to at least one propagation delay between the base station and the mobile station. Synchronization is looked for by the module 22 which tests successive sequences of period 1023 until it finds one that corresponds to the reference sequence PN of the transmitting base station, and which presents a time offset relative thereto equal to the propagation delay over a propagation path. A priori there are 256×1023 possible sequences to be tested, each corresponding to one of the 256 possible Gold sequences for the sequence PN, subjected to a time offset lying in the range 0 to 1022 positions.

For each tested sequence, the module 22 calculates the quantities $E[s(t)\cdot s^*(t-\tau)]$ and $E[s(t)\cdot s^*(t)]$ in which $s(t)=r(t)\cdot c(t)$ is the product, as calculated by a multiplier 24, of the instantaneous value of the received signal r(t) by the instantaneous value of the tested sequence c(t) as provided by a pseudorandom generator 23;

$\tau$ is a predetermined time delay which is preferably of the same order as the inverse of the chip rate of the reference sequence PN; thus, for a rate of 1 MHz, it would be possible to chose $\tau=1\,\mu s$; and the notation $E[\cdot]$ represents a mean value calculated over a predetermined integration time T which is preferably of the same order as the period of the reference sequence PN (1.023 ms).

The complex conjugate $s^*(t)$ of s(t) is calculated at 26 and is then multiplied by s(t) by the multiplier 28 whose output is applied to the integrator 30. In parallel, the signal s(t) is delayed by $\tau$, at 32, and then the complex conjugate of $s(t-\tau)$ is calculated at 34 and is multiplied by s(t) by the multiplier 36 whose output is applied to the integrator 38. At the end of each integration period T, the integrators 30 and 38 deliver the quantities $E[s(t)\cdot s^*(t)]$ and $E[s(t)\cdot s^*(t-\tau)]$, respectively.

The modulus E1 of the complex quantity $E[s(t)\cdot s^*(t-\tau)]$ is calculated at 40, after which the ratio $E1/E2=|E[s(t)\cdot s^*(t-\tau)]|/E[s(t)\cdot s^*(t)]$ is calculated at 42. A decision unit 44 compares this ratio with a predetermined threshold $1/\lambda$ in order to determine whether the sequence under test is correct and synchronized. If $E1/E2<1/\lambda$, then the decision unit 44 controls the generator 23 to test another sequence which will either be the same Gold sequence subjected to a different offset, or else will be a different Gold sequence. If $E1/E2\geqq 1/\lambda$, it is considered that the tested sequence corresponds to the reference sequence of the base station with an offset that relates to the time delay over a propagation path between the base station and the mobile station. The value of this offset is transmitted to the pseudorandom generator 21 of the processing circuits 20 so as to enable them to apply the same offset to the spreading sequence PNi of the mobile station in order to achieve time synchronization with the observed propagation path.

In the example described, it has be seen that the spreading sequences PN1, PN2, . . . PNn of the various mobile stations are all obtained by applying an offset characteristic of the mobile station to a base sequence that is very long. At the mobile station, this characteristic offset is stored in a memory 48 of an address recovery module 50 which processes the synchronization channel CS. Once the reference sequence PN of a base station has been detected with an appropriate time offset, the Gold sequence PN' being associated with said reference sequence is also known. The decision unit 44 then controls the pseudorandom generator 52 of the module 50 so that it delivers the associated sequence PN' with the determined time offset. This associated sequence, which is thus synchronized, is applied to the signal r(t) by the multiplier 54 whose output is applied to the input of an integrator 56 having an integration time of the order of the duration of one bit on the synchronization channel CS. The correlation provided by the integrator 56 corresponds to the address bits transmitted over the channel CS. The offset stored in the memory 48 is applied, at 58, to the received address ADD so as to provide the pseudorandom generator 21 of the circuits 20 with the position that it needs to take up in the long base sequence. This position is then modified to take account of the additional offset due to propagation delay, as provided by the decision unit 44.

Figure 2:
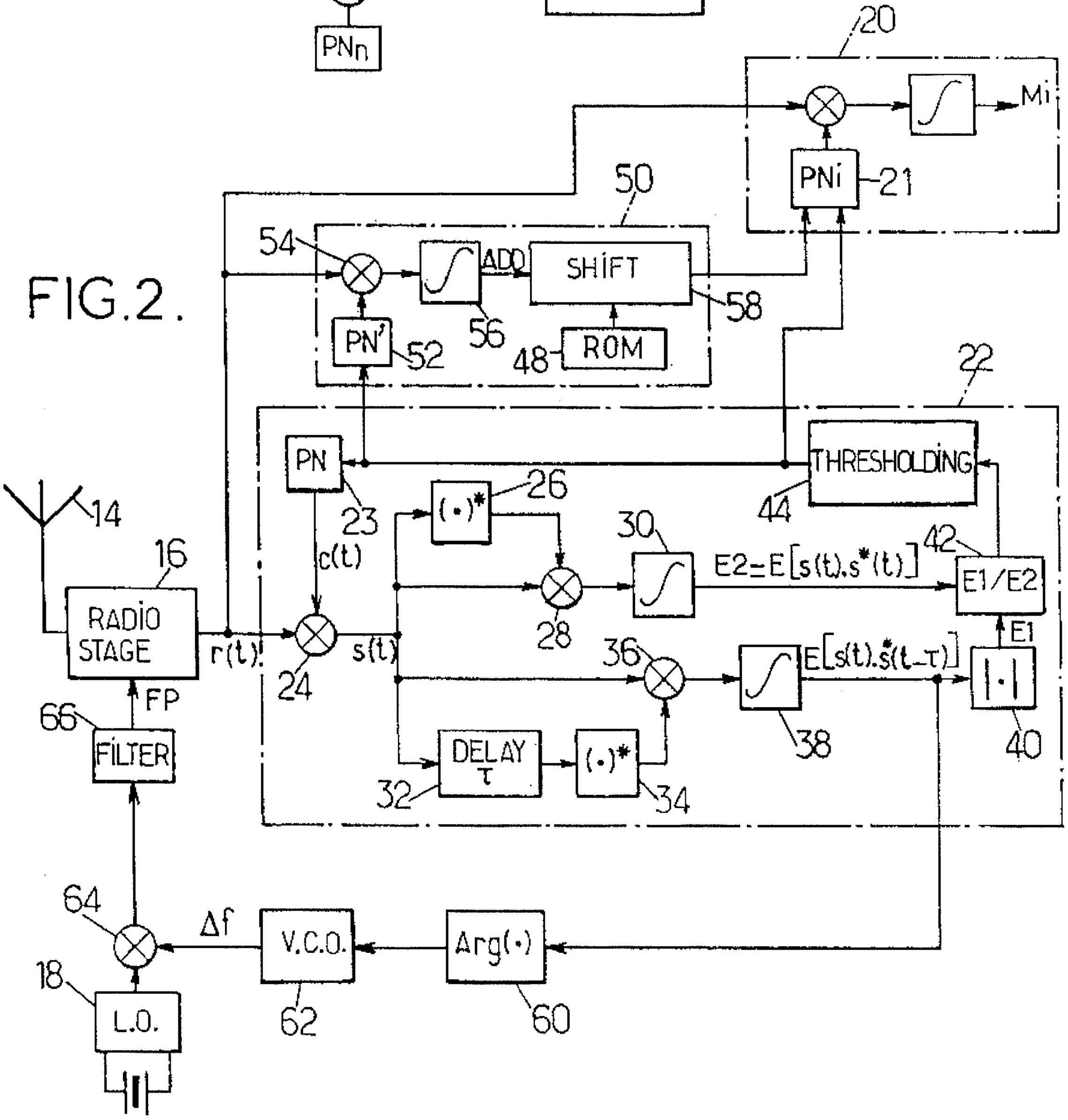
FIG. 2 is a block diagram of the receiver portion of a mobile station in the system.

Circuits other than those shown in FIG. 2 can be used to calculate the quantities $E[s(t)\cdot s^*(t-\tau)]$ and $E[(s(t)\cdot s^*(t)]$. For example, the synchronization module 22 may be replaced by the module 122 shown in FIG. 2, in which identical numerical references designate elements that are similar to elements in FIG. 2.

Figure 3:
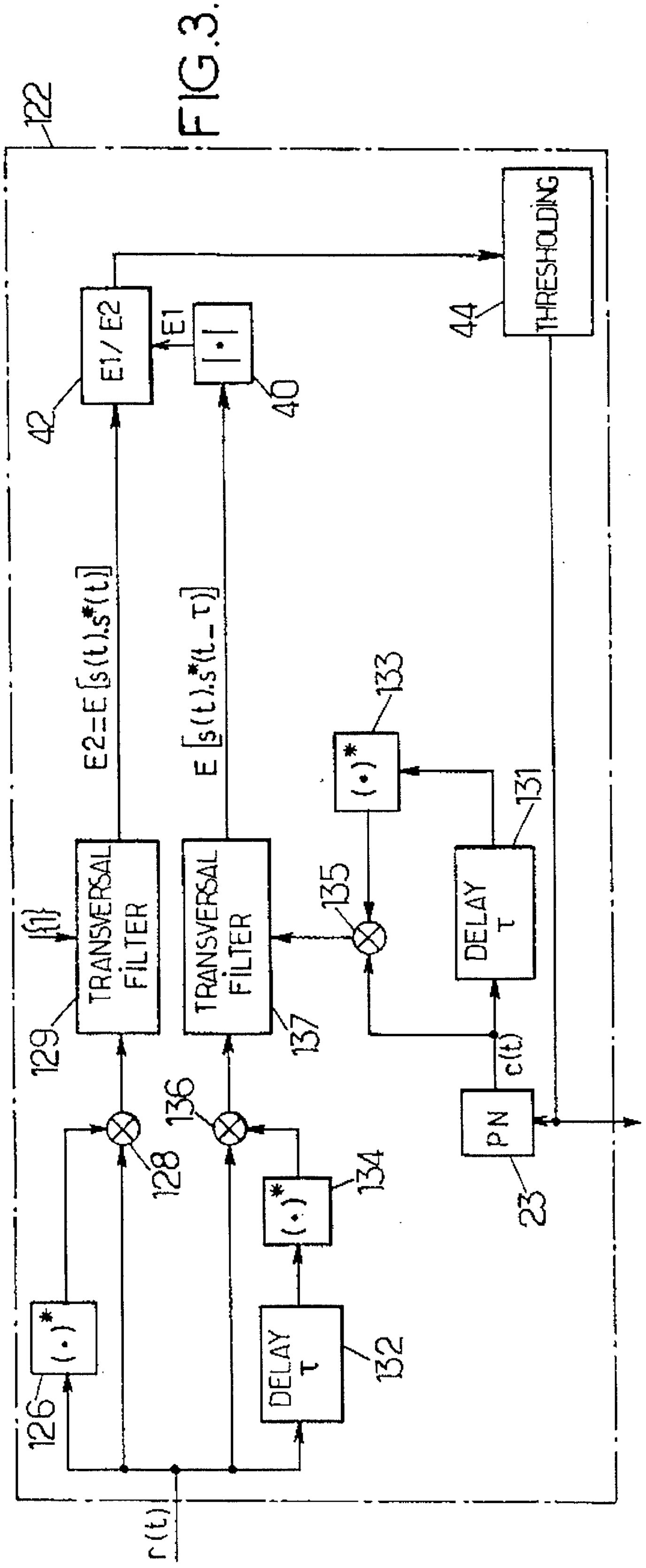
FIGS. 3 and 4 are diagrams showing variants of the synchronization module in the mobile station of FIG. 2.

Given that ignoring a normalization constant, $c(t)\cdot c^*(t)=1$ for any tested pseudorandom sequence, the energy quantities $E[s(t)\cdot s^*(t)]$ and $E[r(t)\cdot r^*(t)]$ are identical. The latter quantity can be calculated by the top branch of the module 122 in FIG. 3. The complex conjugate $r^*(t)$ is obtained at 126, then multiplied by r(t) by the multiplier 128, whose output is applied to the input of a transversal filter 129. The coefficients of the filter 129 are equal to 1 in its real portion and 0 in its imaginary portion so that said filter acts as an integrator for calculating the mean value E2. The multiplier 136 provides the instantaneous value of $r(t)\cdot r^*(t-\tau)$ to the input of another transversal filter 137, said instantaneous value being obtained by multiplying the signal r(t) by the complex conjugate (as calculated in 134) of the same signal as delayed by $\tau$ in 132. The coefficients of the filter 137 are equal to the successive values of the samples $c(t)\cdot c(t-\tau)$. They are provided by a multiplier 135 having one input that receives the instantaneous value c(t) of the tested sequence as produced by the generator 23, and another input that receives the complex conjugate of the value of the sequence as delayed by $\tau$, as calculated by the elements referenced 131 and 133. It can be verified that the output from the filter 137 is indeed equal to the complex quantity $E[s(t)\cdot s^*(t-\tau)]$ that is to be calculated. This quantity is then processed and compared with E2 by circuits identical to those of FIG. 2.

In the ideal case, where the base station transmits only over the pilot channel CP and where there exists only one noiseless propagation path, the received signal r(t) will have the form $r(t)=A(t)\cdot c'(t)\cdot e^{2\pi j\Delta ft}$. Under such circumstances, it has been shown that synchronization means that $E1/E2 \approx 1$, whereas lack of synchronization means that $E1/E2 << 1$. The sequences PN can therefore be selected on the basis of a threshold $1/\lambda$ lying in the range 0 to 1. To take other CDMA channels into account, together with multiple paths and noise, it is necessary to select an appropriate threshold level $1/\lambda$, given that the largest values of the ratio E1/E2 always correspond to synchronization over a propagation path, provided that the attenuation A(t) and the frequency deviation $\Delta f$ do not vary too much at the time scale over which the mean values are calculated. In practice, the value of $\lambda$ may be determined experimentally or by simulation. In the example described, satisfactory results have been obtained using simulation with $\lambda=10$ and with $\lambda=15$. To reduce the disturbance from the other CDMA channels, it is also possible, in the base station, to combine channels by giving greater weighting to the pilot channel CP.

The time required for the synchronization is at most $256 \times 1023 = 261888$ times the test duration of a sequence. If the integration time for calculating the mean values is of the same order as the period of the sequence PN, that can lead to long synchronization times, unless the mobile station has a priori knowledge of the cell in which it is present. The synchronization time can be reduced by storing portions of the signal r(t) in a buffer register and by performing on said portions parallel calculations of ratios E1/E2 so as to be able to test sequences more rapidly.

To reduce the time required for synchronization, it is also possible to implement the integrators 30, 38 with an integration time that is less than the period of the reference sequence PN, e.g. a time that is a few tens of times longer than the duration of a chip. This makes it possible to select sequences that are subsequently subjected to synchronization verification in which the same calculations and the same comparisons are performed, but using longer integration times T in the integrators 30,38, i.e. times of the same order as the period of the sequence. The tested sequence is finally accepted only if verification is positive.

To optimize the mean duration of synchronization, reference may be made to the article "Acquisition time performance of PN Spread-Spectrum systems" by J. K. HOLMES, IEEE Trans. on Comm., Vol. com-25, N° 8, August 1977, pages 778–783.

Figure 4:
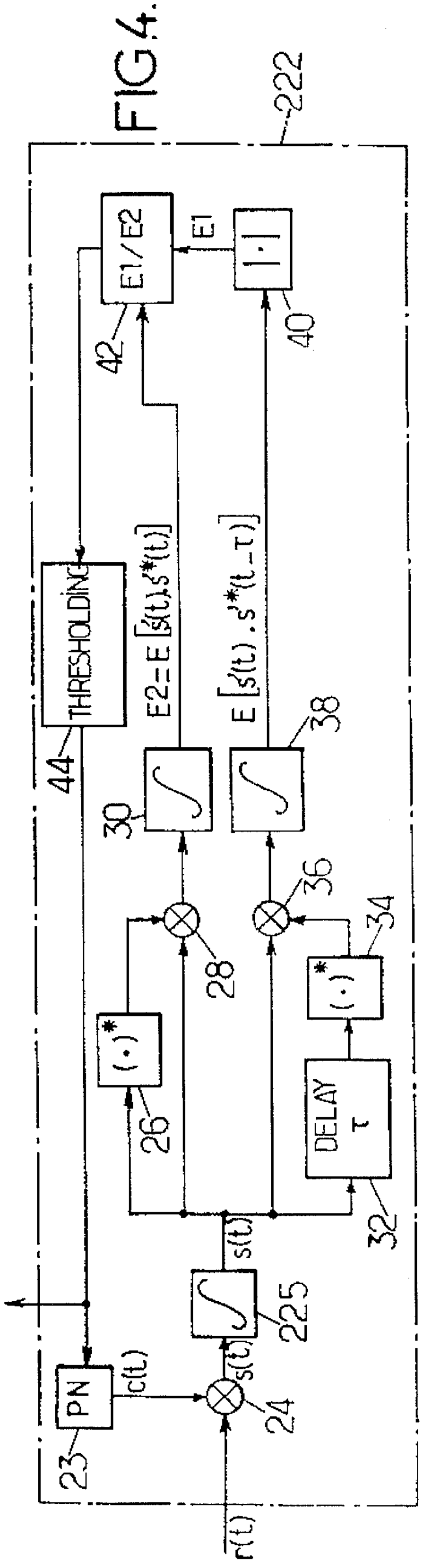

To optimize the performance of the method in the presence of a low signal to noise ratio, the mean values may be calculated not on the basis of the signals s(t), but on the basis of signals s'(t) obtained by a first integration of s(t). Under that circumstances, a synchronization module 222 is used such as a module shown in FIG. 4. This synchronization module is identical to the module of FIG. 2, except in that an integrator 225, having an integration time $T_1$ that is small compared with the period of the reference sequence is placed at the output of the multiplier 24 providing s(t). The integrator makes it possible to reduce the power of the noise added to the signal so that said noise interfers less during the subsequent operations. Such a solution can only be adopted if the first integration is feasable: If excessive frequency deviation causes the phase of the received signal to rotate in such a manner that the results of the integration are meaningless, then the operation is pointless. The limit set on said integration time $T_1$ is such that if $T_1 = N \cdot T_0$ (while $T_0$ is the duration of a sample of signal s(t), then it is necessary for: $2\tau\Delta f \cdot N \cdot T_0 < \tau$ and thus for $N < 1/(2 \cdot \Delta f \cdot T_0)$. The various integration times are such that the total integration time is of the same order as the period of the reference sequence PN.

The method of the invention makes it possible to identify a base station by detecting its reference sequence, to achieve time synchronization with said base station by determining a propagation delay, and also to perform frequency correction to take frequency deviation, if any, into account.

From equation (1) it can be seen that the argument of the complex quantity $E[s(t) \cdot s^*(t-\tau)]$, as calculated when testing sequences, is proportional to the frequency deviation $\Delta f$. The argument of $E[s(t) \cdot s^*(t-\tau)]$ is extracted to control a voltage controlled oscillator 62. The output from the oscillator 62 is at the frequency $\Delta f$, and it is applied to input of a mixer 64, whose other input receives the carrier delivered by the local oscillator 18. The carrier frequency is thus corrected, after filtering 66, in a manner that is proportional to the argument of the $E[s(t) \cdot s^*(t-\tau)]$ to compensate for the frequency deviation.

However, it is not necessary to wait for such deviation to be fully compensated before proceeding with a search for synchronization, because the synchronization test relies on the module E1 of $E[s(t) \cdot s^*(t-\tau)]$ which is not influenced by the frequency deviation $\Delta f$.

Since the argument $2\pi \cdot \Delta f \cdot \tau$ of the quantity $E[s(t) \cdot s^*(t-\tau)]$ is small, the calculation of said argument by the block 60 can be reduced merely to:

$$2\pi \cdot \Delta f \cdot \tau = \sin(2\pi \cdot \Delta f \cdot \tau) = Im\{E[s(t) \cdot s^*(t-\tau)]\}/E1,$$

where Im {. . . } represents the imaginary part.

We claim:

1. A method of synchronization for code division multiple access (CDMA) radiotelephone communications in which each of a plurality of base stations establishes a pilot channel in addition to a plurality of CDMA transmission channels each defined by a respective spreading sequence modulating data bits to be transmitted, and transmits over said pilot channel a periodic pseudorandom reference sequence synchronized with said spreading sequences, having a chip rate greater than the bit rate of said data bits to be transmitted and belonging to a predetermined set of reference sequences, the base band signals transmitted over said pilot channel and said CDMA transmission channels of each base station being combined and then modulated on a carrier frequency to form a radio signal transmitted by said base station to mobile stations, said method comprising the following steps at a mobile station:

(i) calculating the quantities $E\{s(t) \cdot s^*(t-\tau)\}$ and $E\{s(t) \cdot s^*(t)\}$, in which $E\{\cdot\}$ designates a mean value calculated over a predetermined integration time, $\tau$ designates a predetermined delay, and $s(t)=r(t) \cdot c(t)$ designates the product of (a) the received base band signal and (b) the value of a candidate sequence corresponding to a time-offset version of a reference sequence belonging to said predetermined set;

(ii) calculating the ratio $|E\{s(t) \cdot s^*(t-\tau)\}|/E\{s(t) \cdot s^*(t)\}$;

(iii) comparing said ratio with a predetermined threshold;

(iv) if said comparing of step (iii) determines that said ratio exceeds the predetermined threshold, selecting said candidate sequence as corresponding to and being synchronized with a reference sequence transmitted over the pilot channel of one of said plurality of base stations and received by the mobile station over a propagation path; and (v) if said comparing of step (iii) shows that said ratio does not exceed the predetermined threshold, repeating steps (i) through (v) for another candidate sequence.

2. A method according to claim 1, wherein said predetermined integration time is of the same order as the period of the reference sequences.

3. A method according to claim 1, wherein said predetermined delay is of the same order as the inverse of the chip rate of the reference sequences.

4. A method according to claim 1, wherein a carrier frequency, used for obtaining the base band signal by demodulating the radio signal received by the mobile station, is modified by applying a correction thereto, which correction is proportional to the argument of the complex quantity $E\{s(t)\cdot s^*(t-\tau)\}$ calculated in step (i).

5. A method of synchronization for code division multiple access (CDMA) radiotelephone communications in which each of a plurality of base stations establishes a pilot channel in addition to a plurality of CDMA transmission channels each defined by a respective spreading sequence modulating data bits to be transmitted, and transmits over said pilot channel a periodic pseudorandom reference sequence synchronized with said spreading sequence, having a chip rate greater than the bit rate of said data bits to be transmitted and belonging to a predetermined set of reference sequences, the base band signals transmitted over said pilot channel and said CDMA transmission channels of each base station being combined and then modulated on a carrier frequency to form a radio signal transmitted by said base station to mobile stations, said method comprising the following steps at a mobile station:

(i) calculating the quantities $E\{s'(t)\cdot s'^*(t-\tau)\}$ and $E\{s'(t)\cdot s'^*(t)\}$, in which $E\{\cdot\}$ designates the mean value calculated over a first integration time, $\tau$ designates a predetermined delay, and $s'(t)$ designates a signal obtained by integrating, over a second integration time shorter than said first integration time, the product of (a) the received base band signal and (b) the value of a candidate sequence corresponding to a time-offset version of a reference sequence belonging to said predetermined set;

(ii) calculating the ratio $|E\{s'(t)\cdot s'^*(t-\tau)\}|/E\{s'(t)\cdot s'^*(t)\}$;

(iii) comparing said ratio with a predetermined threshold;

(iv) if said comparing of step (iii) determines that said ratio exceeds the predetermined threshold, selecting said candidate sequence as corresponding to and being synchronized with a reference sequence transmitted over the pilot channel of one of said plurality of base stations and received by the mobile station over a propagation path; and (v) if said comparing of step (iii) determines that said ratio does not exceed the predetermined threshold, repeating steps (i) through (v) for another candidate sequence.

6. A method according to claim 5, wherein said first integration time is of the same order as the period of the reference sequences.

7. A method according to claim 5, wherein said predetermined delay is of the same order as the inverse of the chip rate of the reference sequences.

8. A method according to claim 5, wherein a carrier frequency, used for obtaining the base band signal by demodulating the radio signal received by the mobile station, is modified by applying a correction thereto, which correction is proportional to the argument of the complex quantity $E\{s'(t)\cdot s'^*(t-\tau)\}$ calculated in step (i).

9. A method of synchronization for code division multiple access (CDMA) radiotelephone communications in which each of a plurality of base stations establishes a pilot channel in addition to a plurality of CDMA transmission channels each defined by a respective spreading sequence modulating data bits to be transmitted, and transmits over said pilot channel a periodic pseudorandom reference sequence synchronized with said spreading sequences, having a chip rate greater than the bit rate of said data bits to be transmitted and belonging to a predetermined set of reference sequences, the base band signals transmitted over said pilot channel and said CDMA transmission channels of each base station being combined and then modulated on a carrier frequency to form a radio signal transmitted by said base station to mobile stations, said method comprising the following steps at a mobile station:

(i) calculating the quantities $E\{s(t)\cdot s^*(t-\tau)\}$ and $E\{s(t)\cdot s^*(t)\}$, in which $E\{\cdot\}$ designates the mean value calculated over a first integration time shorter than the period of the reference sequences, $\tau$ designates a predetermined delay, and $s(t)=r(t)\cdot c(t)$ designates the product of (a) the received base band signal and (b) the value of a candidate sequence corresponding to a time-offset version of a reference sequence belonging to said predetermined set;

(ii) calculating the first ratio $|E\{s(t)\cdot s^*(t-\tau)\}|/E\{s(t)\cdot s^*(t)\}$;

(iii) comparing said first ratio with a predetermined threshold;

(iv) if said comparing of step (iii) determines that said ratio exceeds the predetermined threshold, verifying the candidate sequence through the following sub-steps:

(iv-a) calculating the quantities $E'\{s(t)\cdot s^*(t-\tau)\}$ and $E'\{s(t)\cdot s^*(t)\}$, in which $E'\{\cdot\}$ designates the means value calculated over a second integration time longer than said first integration time;

(iv-b) calculating the second ratio $|E'\{s(t)\cdot s^*(t-\tau)\}|/E'\{s^*(t)\}$;

(iv-c) comparing said second ratio with the predetermined threshold;

(iv-d) if the comparing step (iv-c) shows that said second ratio exceeds the predetermined threshold, selecting said candidate sequence as corresponding to and being synchronized with a reference sequence transmitted over the pilot channel of one of said plurality of base stations and received by the mobile station over a propagation path; and (iv-e) if the comparing step (iv-c) determines that said ratio does not exceed the predetermined threshold, repeating steps (i) through (v) for another candidate sequence;

(v) if the comparing step (iii) determines that said first ratio does not exceed the predetermined threshold, repeating steps (i) through (v) for another candidate sequence.

10. A method according to claim 9, wherein said second integration time is of the same order as the period of the reference sequences.

11. A method according to claim 9, wherein said predetermined delay is of the same order as the inverse of the chip rate of the reference sequences.

12. A method according to claim 9, wherein a carrier frequency, used for obtaining the base band signal by demodulating the radio signal received by the mobile station, is modified by applying a correction thereto, which correction is proportional to the argument of the complex quantity $E\{s(t)\cdot s^*(t-\tau)\}$ calculated in step (i).

13. A method according to claim 9, wherein a carrier frequency, used for obtaining the base band signal by demodulating the radio signal received by the mobile station, is modified by applying a correction thereto, which correction is proportional to the argument of the complex quantity $E'\{s(t)\cdot s^*(t-\tau)\}$ calculated in sub-step (iv-a).

* * * * *